(12) United States Patent
Blair et al.

(10) Patent No.: US 12,403,467 B2
(45) Date of Patent: Sep. 2, 2025

(54) SYSTEMS AND RELATED TEMPERATURE CALIBRATION METHODS

(71) Applicant: ILLUMINA, INC., San Diego, CA (US)

(72) Inventors: Dustin Blair, Escondido, CA (US); Xiangxiong Chen, Palo Alto, CA (US); Gabriel Chan, San Diego, CA (US); Bindya Rani Dhanekula, La Jolla, CA (US); John Earney, San Diego, CA (US); Damian Kelley, San Mateo, CA (US)

(73) Assignee: ILLUMINA, INC., San Diego, CA (US)

( * ) Notice: Subject to any disclaimer, the term of this patent is extended or adjusted under 35 U.S.C. 154(b) by 328 days.

(21) Appl. No.: 18/086,347

(22) Filed: Dec. 21, 2022

(65) Prior Publication Data
US 2023/0201825 A1    Jun. 29, 2023

Related U.S. Application Data

(60) Provisional application No. 63/293,294, filed on Dec. 23, 2021.

(51) Int. Cl.
*B01L 3/00* (2006.01)
*G01J 5/80* (2022.01)

(52) U.S. Cl.
CPC ........... *B01L 3/502715* (2013.01); *G01J 5/80* (2022.01); *B01L 2300/0877* (2013.01); *B01L 2300/1894* (2013.01)

(58) Field of Classification Search
CPC ....... B01L 3/502715; B01L 2300/0877; B01L 2300/1894; B01L 2200/143;
(Continued)

(56) References Cited

U.S. PATENT DOCUMENTS

| 4,639,883 A | 1/1987 | Michaelis |
| 6,230,497 B1 | 5/2001 | Morris et al. |

(Continued)

FOREIGN PATENT DOCUMENTS

| EP | 1795898 B1 | 6/2007 |
| WO | WO-91/06678 A1 | 5/1991 |

(Continued)

OTHER PUBLICATIONS

Bentley et al., "Accurate whole human genome sequencing using reversible terminator chemistry," Nature 456:53-59 (2008).

*Primary Examiner* — Timothy P Graves
(74) *Attorney, Agent, or Firm* — MARSHALL, GERSTEIN & BORUN LLP

(57) ABSTRACT

Systems and related temperature calibration methods. In accordance with a first implementation, an apparatus includes a flow cell interface, a temperature control device, an infrared sensor, and a controller. The flow cell interface includes a flow cell support and the temperature control device is for the flow cell support. The controller is to command the temperature control device to cause the flow cell support to achieve a temperature value, cause the infrared sensor to measure an actual temperature value of the flow cell support, and calibrate the temperature control device based on a difference between the commanded temperature value and the actual temperature value.

23 Claims, 9 Drawing Sheets

(58) Field of Classification Search
CPC ....... B01L 2200/147; B01L 2300/0663; B01L 2300/1822; B01L 2400/0487; B01L 2400/0605; B01L 2400/0638; B01L 2400/0644; B01L 2400/0655; B01L 2400/0666; B01L 7/52; G01J 5/80; G01N 35/00693; Y02E 60/50
See application file for complete search history.

(56) References Cited

U.S. PATENT DOCUMENTS

| | | |
|---|---|---|
| 6,266,459 B1 | 7/2001 | Walt et al. |
| 6,355,431 B1 | 3/2002 | Chee et al. |
| 6,499,306 B2 | 12/2002 | Gillen |
| 6,725,669 B2 | 4/2004 | Melaragni |
| 6,770,441 B2 | 8/2004 | Dickinson et al. |
| 6,857,276 B2 | 2/2005 | Finn et al. |
| 6,859,570 B2 | 2/2005 | Walt et al. |
| 6,887,429 B1 | 5/2005 | Marshall et al. |
| 6,951,114 B2 | 10/2005 | Grisham et al. |
| 6,982,412 B2 | 1/2006 | Watson et al. |
| 7,057,026 B2 | 6/2006 | Barnes et al. |
| 7,211,414 B2 | 5/2007 | Hardin et al. |
| 7,315,019 B2 | 1/2008 | Turner et al. |
| 7,329,492 B2 | 2/2008 | Hardin et al. |
| 7,405,281 B2 | 7/2008 | Xu et al. |
| 7,507,019 B2 | 3/2009 | Price |
| 7,622,294 B2 | 11/2009 | Walt et al. |
| 8,785,856 B2 | 7/2014 | Maston |
| 10,018,520 B2 | 7/2018 | Ostermeyer et al. |
| 10,137,452 B2 | 11/2018 | Conner et al. |
| 10,544,966 B2 | 1/2020 | Fromm et al. |
| 10,581,279 B2 | 3/2020 | Mantese et al. |
| 10,643,826 B2 | 5/2020 | Kim et al. |
| 10,816,285 B2 | 10/2020 | Chattoraj et al. |
| 2002/0121094 A1 | 9/2002 | VanHoudt |
| 2005/0103876 A1 | 5/2005 | Martinez |
| 2005/0227252 A1 | 10/2005 | Moon et al. |
| 2008/0019881 A1* | 1/2008 | Fujimoto ......... G01N 35/00029 422/50 |
| 2008/0108082 A1 | 5/2008 | Rank et al. |
| 2013/0223472 A1 | 8/2013 | Maston |
| 2016/0356715 A1* | 12/2016 | Zhong ................ G01N 21/6454 |
| 2017/0350851 A1* | 12/2017 | Sauerbrey ............ G01N 27/416 |
| 2019/0113398 A1* | 4/2019 | Comas ...................... G01J 5/53 |
| 2019/0154510 A1 | 5/2019 | Frank et al. |
| 2020/0072803 A1 | 3/2020 | Halle et al. |
| 2021/0262706 A1 | 8/2021 | Jaffrey |
| 2021/0381977 A1 | 12/2021 | Zhong et al. |

FOREIGN PATENT DOCUMENTS

| | | |
|---|---|---|
| WO | WO-00/63437 A2 | 10/2000 |
| WO | WO-2004/011861 A1 | 2/2004 |
| WO | WO-2004/018497 A2 | 3/2004 |
| WO | WO-2004/024328 A1 | 3/2004 |
| WO | WO-2005/033681 A1 | 4/2005 |
| WO | WO-2007/123744 A2 | 11/2007 |
| WO | WO-2008/080106 A1 | 7/2008 |
| WO | WO-2016/014574 A1 | 1/2016 |
| WO | WO-2018/156149 A1 | 8/2018 |

* cited by examiner

SYSTEMS AND RELATED TEMPERATURE CALIBRATION METHODS

RELATED APPLICATION SECTION

This application claims the benefit of and priority to U.S. Provisional Patent Application No. 63/293,294, filed Dec. 23, 2021, the content of which is incorporated by reference herein in its entireties and for all purposes.

BACKGROUND

Instruments such as sequencing instruments may include temperature controlled components.

SUMMARY

Advantages of the prior art can be overcome and benefits as described later in this disclosure can be achieved through the provision of systems and related temperature calibration methods. Various implementations of the apparatus and methods are described below, and the apparatus and methods, including and excluding the additional implementations enumerated below, in any combination (provided these combinations are not inconsistent), may overcome these shortcomings and achieve the benefits described herein.

In accordance with a first implementation, an apparatus includes a flow cell interface, a temperature control device, an infrared sensor, and a controller. The flow cell interface includes a flow cell support and the temperature control device is for the flow cell support. The controller is to command the temperature control device to cause the flow cell support to achieve a temperature value, cause the infrared sensor to measure an actual temperature value of the flow cell support, and calibrate the temperature control device based on a difference between the commanded temperature value and the actual temperature value.

In accordance with a second implementation, a method includes commanding a temperature control device of a system to cause a flow cell support to achieve a temperature value. The method also includes measuring an actual temperature value of the flow cell support using an infrared sensor and calibrating the temperature control device based on a difference between the commanded temperature value and the actual temperature value.

In accordance with a third implementation, a method includes commanding a temperature control device of a system to cause a flow cell support to achieve a temperature value and measuring a plurality of actual temperature value of the flow cell support using an infrared sensor. The method also includes determining an average actual temperature value based on the plurality of actual temperature values and calibrating the temperature control device based on a difference between the commanded temperature value and the average actual temperature value.

In accordance with a fourth implementation, an apparatus includes a flow cell interface, a temperature control device, an infrared sensor, and a controller. The flow cell interface includes a flow cell support and the temperature control device is for the flow cell support. The controller is to command the temperature control device to cause the flow cell support to achieve a temperature value, and cause the infrared sensor to measure a plurality of actual temperature values of the flow cell support.

In accordance with a fifth implementation, a method includes commanding a temperature control device to cause a flow cell support to achieve a temperature value; measuring an actual temperature value of a flow cell disposed on the flow cell support using an infrared sensor; comparing the commanded temperature value and the actual temperature value; and generating an alert when a difference between the commanded temperature value and the actual temperature value is greater than a threshold.

In accordance with a sixth implementation, an apparatus includes a flow cell interface, a temperature control device, an infrared sensor, a temperature sensor, and a controller. The flow cell interface includes a flow cell support and the temperature control device is for the flow cell support. The infrared sensor is to measure a first temperature value adjacent to the temperature sensor; the temperature sensor is to measure a second temperature value; and the controller is to calibrate the infrared sensor based on a difference between the first temperature value and the second temperature value.

In accordance with a seventh implementation, an apparatus includes a flow cell interface, a temperature control device, an infrared sensor, and a controller. The flow cell interface including a flow cell support and the temperature control device for the flow cell support. The controller to command the temperature control device to cause the flow cell support to achieve a temperature value, and cause the infrared sensor to measure a plurality of actual temperature values of the flow cell support.

In further accordance with the foregoing first, second, third, fourth, fifth, sixth, and/or seventh implementations, an apparatus and/or method may further comprise or include any one or more of the following:

In accordance with an implementation, the temperature control device includes a thermoelectric cooler.

In accordance with another implementation, the temperature control device includes a resistance temperature detector.

In accordance with another implementation, the controller is to calibrate the temperature control device by calibrating the resistance temperature detector.

In accordance with another implementation, the apparatus includes an imaging system. The infrared sensor is coupled to the imaging system.

In accordance with another implementation, the apparatus includes a bracket coupling the infrared sensor to the imaging system.

In accordance with another implementation, the controller is further to calibrate the infrared sensor.

In accordance with another implementation, the apparatus also includes a temperature sensor. The infrared sensor is to measure a first temperature value adjacent to the temperature sensor, the temperature sensor is to measure a second temperature value, and the controller is to calibrate the infrared sensor based on a difference between the first temperature value and the second temperature value.

In accordance with another implementation, the flow cell interface further includes a flow cell deck carrying the flow cell support. The temperature sensor is coupled to the flow cell deck.

In accordance with another implementation, the apparatus includes a printed circuit board coupled to the temperature sensor. The printed circuit board is positioned between the temperature sensor and the flow cell deck.

In accordance with another implementation, the apparatus includes a metallic layer covering a surface of the temperature sensor.

In accordance with another implementation, the metallic layer and a surface of the flow cell support have substantially similar emissivity.

In accordance with another implementation, the temperature sensor and the metallic layer are spaced from the flow cell support.

In accordance with another implementation, the metallic layer includes aluminum.

In accordance with another implementation, the apparatus includes thermally conductive epoxy coupling the temperature sensor and the metallic layer.

In accordance with another implementation, the apparatus also includes a temperature sensor. The infrared sensor is to measure a first temperature value of the flow cell support, the temperature sensor is to measure a second temperature value at the flow cell support, and the controller is to calibrate the infrared sensor based on a difference between the first temperature value and the second temperature value.

In accordance with another implementation, the temperature sensor is coupled to the flow cell support.

In accordance with another implementation, the apparatus also includes a printed circuit board coupled to the temperature sensor. The temperature sensor is positioned between the flow cell interface and the printed circuit board.

In accordance with another implementation, a surface of the flow cell support includes a metallic layer.

In accordance with another implementation, the temperature sensor includes a digital temperature sensor.

In accordance with another implementation, commanding the temperature control device to cause the flow cell support to achieve the temperature value includes: commanding a thermoelectric cooler to cause the flow cell support to achieve the temperature value; and measuring the temperature value with a resistance temperature detector.

In accordance with another implementation, measuring the actual temperature value for the flow cell support using the infrared sensor includes measuring the actual temperature value for the flow cell support using the infrared sensor while moving the flow cell interface relative to the infrared sensor.

In accordance with another implementation, the method also includes commanding the temperature control device to cause the flow cell support to achieve a second temperature value, measuring a second actual temperature value of a flow cell disposed on the flow cell support using the infrared sensor, comparing the second commanded temperature value and the second actual temperature value, and recalibrating the temperature control device based the comparison.

In accordance with another implementation, the method also includes: causing the system to perform at least a portion of an analysis on one or more samples of interest within a flow cell disposed on the flow cell support, commanding the temperature control device to cause the flow cell support to achieve a second temperature value; measuring a second actual temperature value of the flow cell disposed on the flow cell support using the infrared sensor; comparing the second commanded temperature value and the second actual temperature value; and recalibrating the temperature control device based the comparison.

In accordance with another implementation, calibrating the temperature control device is responsive to receiving a command at the controller to calibrate the temperature control device.

In accordance with another implementation, receiving the command at the controller to calibrate the temperature control device includes receiving the command from a remote computing device.

In accordance with another implementation, receiving the command at the controller to calibrate the temperature control device includes receiving user input at a user interface of the system.

In accordance with another implementation, the method includes calibrating the infrared sensor.

In accordance with another implementation, calibrating the infrared sensor includes: measuring a first temperature value adjacent to a temperature sensor carried by the flow cell interface using the infrared sensor, measuring a second temperature value using the temperature sensor, and calibrating the infrared sensor with a controller based on a difference between the first temperature value and the second temperature value.

In accordance with another implementation, calibrating the infrared sensor includes: measuring a first temperature value of the flow cell support using the infrared sensor, measuring a second temperature value at the flow cell support using a temperature sensor where the temperature sensor is carried by the flow cell support, and calibrating the infrared sensor with the controller based on a difference between the first temperature value and the second temperature value.

In accordance with another implementation, calibrating the infrared sensor is responsive to receiving a command at the controller to calibrate the infrared sensor.

In accordance with another implementation, receiving the command at the controller to calibrate the infrared sensor includes receiving the command from a remote computing device.

In accordance with another implementation, receiving the command at the controller to calibrate the infrared sensor includes receiving user input at a user interface of the system.

In accordance with another implementation, calibrating the infrared sensor includes generating data associated with the difference between the first temperature value and the second temperature value and calibrating the infrared sensor with the controller based on the data.

In accordance with another implementation, commanding the temperature control device of the system to cause the flow cell support to achieve the temperature value includes commanding a first zone of the temperature control device of the system to cause a first zone of the flow cell support to achieve the temperature value and wherein measuring the actual temperature value of the flow cell support using the infrared sensor includes measuring an actual temperature value of the first zone of the flow cell support.

In accordance with another implementation, calibrating the temperature control device based on a difference between the commanded temperature value and the actual temperature value includes calibrating a resistance temperature detector of the first zone of the temperature control device based on a difference between the commanded temperature value and the actual temperature value.

In accordance with another implementation, the method also includes 1) commanding a second zone of the temperature control device of the system to cause a second zone of the flow cell support to achieve a second temperature value; 2) measuring an actual temperature value of the second zone of flow cell support using the infrared sensor; and 3) calibrating a resistance temperature detector of the second zone of the temperature control device based on a difference between the commanded temperature value and the actual temperature value.

In accordance with another implementation, the controller is to generate a heat map based on the plurality of actual temperature values measured.

In accordance with another implementation, the controller is to diagnosis an error based on the heat map.

In accordance with another implementation, the controller is to calibrate the temperature control device based on the heat map.

In accordance with another implementation, the heat map includes a 2-D heat map.

In accordance with another implementation, the method also includes calibrating the temperature control device based on the difference between the commanded temperature value and the actual temperature value.

In accordance with another implementation, the apparatus includes a flow cell carrying the temperature sensor.

In accordance with another implementation, the flow cell includes a mock flow cell.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

DETAILED DESCRIPTION

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

The implementations disclosed herein relate to thermal calibration of heating/cooling components and/or temperature sensing components used in sequencing or other systems. Thermal calibration allows for more accurate sequencing performance, as enzymes and sequencing chemistry used in sequencing can be temperature sensitive, and thus thermal calibration is more accurate. The systems include a flow cell support, a temperature control device, an infrared sensor oriented to measure a temperature of the flow cell support, and a controller. The controller calibrates the temperature control device by determining a difference between the temperature measured by the infrared sensor and the temperature that the temperature control device was commanded to generate.

The infrared sensor can be calibrated through the use of a temperature sensor coupled to a structure of the system in some implementations. The infrared sensor measures a first temperature value at or adjacent to the temperature sensor and the temperature sensor measures a second temperature value. The controller of the system calibrates the infrared sensor in some implementations by determining a difference between the temperature measured by the infrared sensor and the temperature measured by the temperature sensor.

Figure 1:
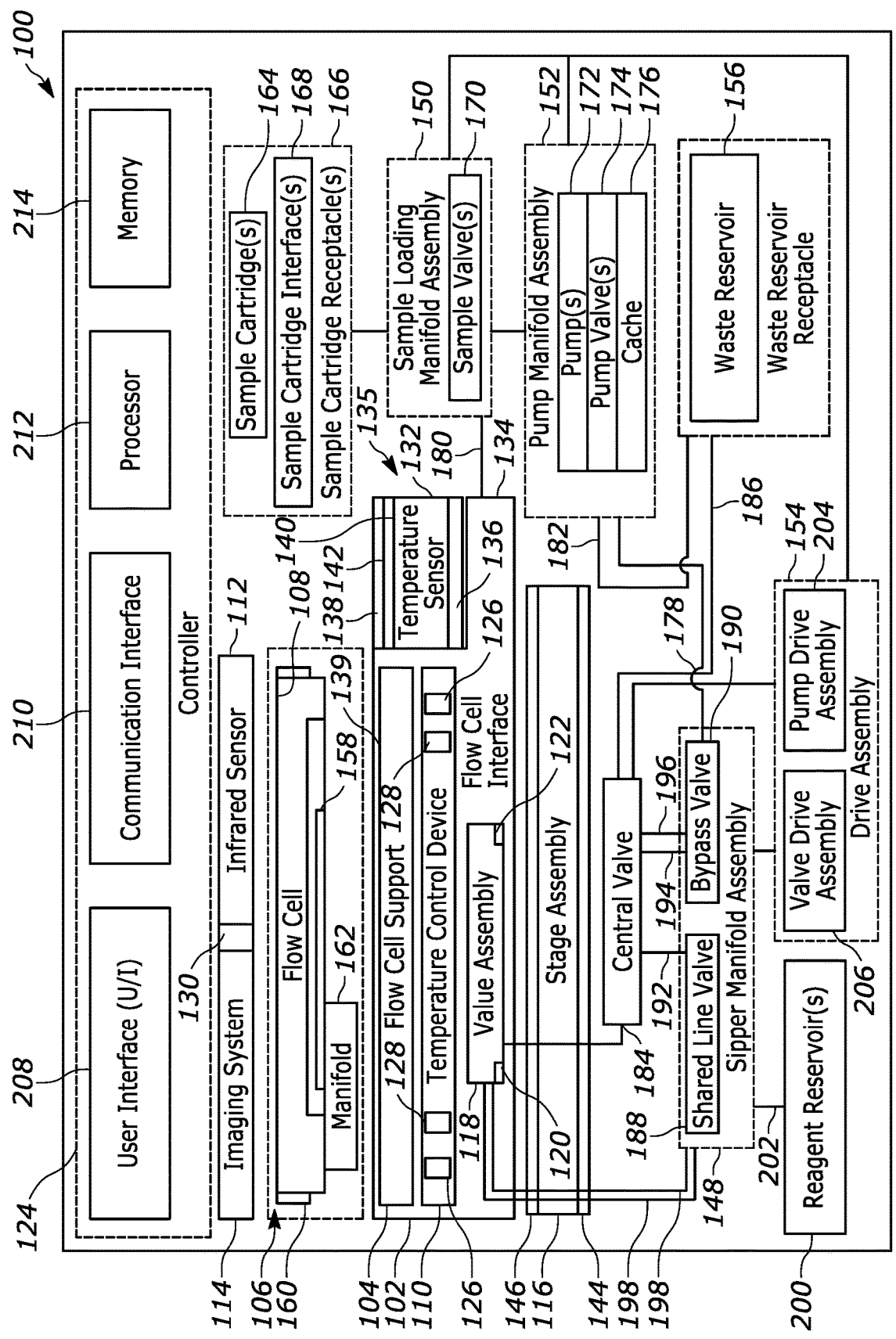
FIG. 1 illustrates a schematic diagram of an implementation of a system in accordance with the teachings of this disclosure.

The disclosed calibration processes allow the temperature control devices to be accurately calibrated without the use of costly calibration tools and/or without a service technician being on site with the system. The disclosed calibration processes also allow for frequent calibrations and fast remote detection and diagnosis of errors. Higher quality temperature calibration can be achieved as a result leading to less downtime, higher sequencing data quality, and/or less spatial variation in data over the flow cell and between flow cells FIG. 1 illustrates a schematic diagram of an implementation of a system 100 in accordance with the teachings of this disclosure. The system 100 can be used to perform an analysis on one or more samples of interest. The sample may include one or more DNA clusters that have been linearized to form a single stranded DNA (sstDNA). The system 100 includes a flow cell interface 102 having a flow cell support 104 that is adapted to support a flow cell assembly 106 including a corresponding flow cell 108 in the implementation shown. The flow cell interface 102 may be associated with and/or referred to as a flow cell deck and the flow cell support 104 may be associated with and/or referred to as a flow cell chuck. The flow cell support 104 can include a vacuum channel, latches, a snap fit mechanism, and/or a tongue-and-groove coupling that is used to secure the flow cell assembly 106 to the flow cell support 104.

The system 100 also includes, in part, a temperature control device 110 for the flow cell support 104, an infrared sensor 112, an imaging system 114, a stage assembly 116, a reagent selector valve assembly 118 that has a reagent selector valve 120 and a valve drive assembly 122, and a controller 124. The reagent selector valve assembly 118 may be referred to as a mini-valve assembly. The controller 124 is electrically and/or communicatively coupled to components of the system 100, such as the temperature control device 110, the infrared sensor 112, the imaging system 114, the stage assembly 116, and the reagent selector valve assembly 118 and is adapted to cause the temperature control device 110, the infrared sensor 112, the imaging system 114, the stage assembly 116, and the reagent selector valve assembly 118 to perform various functions as disclosed herein.

The controller 124 in operation commands the temperature control device 110 to cause the flow cell support 104 to achieve a temperature value and causes the infrared sensor 112 to measure an actual temperature value of the flow cell support 104. The controller 124 may additionally or alternatively cause the infrared sensor 112 to measure an actual temperature value of the flow cell 108 disposed on the flow cell support 104. The system 100 may determine the thermal health of sequencing chemistry operations by determining the actual temperature of the flow cell 108 as an example.

The controller 124 calibrates the temperature control device 110 in this way based on a difference between the commanded temperature value and the actual temperature value. The system 100 can perform the calibration procedure in a self-diagnostic/self-calibration mode and/or a service technician can communicate with the system 100 to perform maintenance on the system 100 and/or calibrate the temperature control device 110. The service technician may calibrate the system 100 in the same location as the system 100 or in a location remote to the system 100 by remotely accessing and/or communicating with the system 100. The system 100 can perform the calibration procedure on a schedule such as before an analysis takes place, while an analysis is taking place, and/or after an analysis takes place, for example. The calibration procedure can be performed at any time, however. The controller 124 may additionally or alternatively generate an alert when a difference between the commanded temperature value and the actual temperature value is greater than a threshold and/or calibrate the temperature control device 110 based on the difference between the commanded temperature value and the actual temperature value. More generally, the controller 124 can perform diagnostics based on the actual temperature values.

In instances when the controller 124 causes the infrared sensor 112 to measure a plurality of actual temperature values of the flow cell support 104, the controller 124 may generate a heat map based on the plurality of actual temperature values measured. The controller 124 can diagnosis an error based on the heat map and/or calibrate the temperature control device 110 based on the heat map in some implementations. The heat map may be a 2-D heat map.

The controller 124 can initiate the calibration procedure in response to receiving a command. The controller 124 can receive the command based on the system 100 initiating and/or performing a process and/or based on a schedule. The controller 124 can receive the command from a remote computing device and/or from an individual using the system 100, however. The remote computing device can be used to calibrate the system 100 to ensure that the system 100 is working properly and/or is within a threshold operating range.

The system 100 also allows the remote computing device to perform tests and/or to diagnose potential errors in the system 100. Put another way, the system 100 allows a service technician to perform maintenance on the system 100 and to identify potential issues with components of the system 100 such as the temperature control device 110, the infrared sensor 112, and/or the flow cell interface 102. The controller 124 can automatically report or output any identified issues or other data to inform the service technician of needed service. While this example mentions a remote computing device accessing the system 100 to perform maintenance and/or diagnostics, the system 100 may also perform a "self-calibration" where the system 100 calibrates the temperature control device 110 and/or the infrared sensor 112. The system 100 can, thus, perform the calibration processes and/or diagnostic processes disclosed with or without input from a service technician.

The controller 124 can calibrate the temperature control device 110 and/or perform diagnostics prior to the system 100 performing an analysis and the flow cell assembly 106 may or may not be placed on the flow cell support 104 during the calibration process. The infrared sensor 112 measures a temperature of the flow cell 108 on the flow cell support 104 in some implementations and, thus, does not directly measure the temperature of the flow cell support 104. The controller 124 can account for a difference between the temperature determined by the resistance temperature detectors 128 at the temperature control device 110 and the temperature determined by the thermoelectric device 110 at the flow cell 108. The system 100 can also perform the calibration procedure and/or perform diagnostics after a portion of an analysis has taken place of one or samples of interest contained within the flow cell 108.

The stage assembly 116 can move the flow cell interface 102 and/or the flow cell support 104 relative to the infrared sensor 112 during the calibration process regardless of the presence of the flow cell 108 to allow the infrared sensor 112 to obtain temperature data for a plurality of locations on the flow cell support 104 and/or on the flow cell 108. The controller 124 can use the measured temperature values to determine a temperature across the flow cell support 104 or the flow cell 108 and/or to determine if a temperature gradient across the flow cell support 104 or the flow cell 108 is within an acceptable threshold, for example.

The temperature control device 110 is shown including one or more thermoelectric coolers 126 and including one or more resistance temperature detectors 128. The thermoelectric coolers 126 may be Peltier devices. While resistance temperature detectors 128 are mentioned being included, the temperature control device 110 may alternatively include any other type of thermometer.

The temperature control device 110 may be positioned underneath the flow cell support 104 and heats/cools the flow cell support 104 and, thus, heats/cools the flow cell 108 on the flow cell support 104. The temperature control device 110 can include different zones 502, 504, 506 (see, FIG. 5) and the controller 124 can command the thermoelectric coolers 126 to achieve a temperature at one or more of the zones 502, 504, 506. The corresponding resistance temperature detector 128 can determine an actual temperature of the zone 502, 504, 506 and provide feedback to the controller 124 that allows the thermoelectric cooler 126 to achieve the commanded temperature value. A feedback loop is thus provided between the controller 124 and the resistance temperature detectors 128. The controller 124 can calibrate the temperature control device 110 by calibrating the resistance temperature detectors 128 of the temperature control device 110 in some implementations.

The infrared sensor 112 can obtain a plurality of actual temperature values of the flow cell support 104 and the controller 124 can determine an average actual temperature value based on the plurality of actual temperature values. The controller 124 can calibrate the temperature control device 110 based on a difference between the commanded temperature value and the average actual temperature value. The infrared sensor 112 can also or alternatively determine the actual temperature value for a plurality of locations on one or more of the zones 502, 504, 506 of the temperature control device 110 and the controller 124 can determine an average actual temperature value for the corresponding zones 502, 504, 506 based on the actual temperature values. The controller 124 can calibrate the resistance temperature detectors 128 for the corresponding zones 502, 504, 506 based on a difference between the commanded temperature values and the average actual temperature values. The controller 124 may alternatively calibrate the resistance temperature detectors 128 for the corresponding zones 502, 504, 506 based on one or more actual temperature values from the infrared sensor 112. The infrared sensor 112 can also or alternatively determine the actual temperature value for a plurality of locations on one or more of the zones 502, 504, 506 of the temperature control device 110 and the controller 124 can generate a heat map and/or perform diagnostics based on the actual temperature values.

The process of the controller 124 calibrating the temperature control device 110 can include the controller 124 calibrating the resistance temperature detectors 128. The controller 124 can calibrate the resistance temperature detectors 128 to more accurately measure the temperature generated by the corresponding thermoelectric cooler 126. Put another way, the controller 124 can calibrate the resistance temperature detectors 128 to compensate for deviation between a measured temperature value and an actual temperature value. The temperature control device 110 includes two thermoelectric coolers 126 and two resistance temperature detectors 128 in the implementation shown. The thermoelectric cooler 126 can, however, include any number of thermoelectric coolers 126 and/or any number of resistance temperature detectors 128.

The controller 124 can calibrate the resistance temperature detectors 128 at any time so that the resistance temperature detectors 128 more accurately measure the temperature generated by the corresponding thermoelectric coolers 126 that is delivered to the flow cell 108. The controller 124 can offset the measurements of the resistance temperature detectors 128 or revise settings of the resistance temperature detectors 128 for calibration.

The infrared sensor 112 is coupled to the imaging system 114, in the implementation shown. The infrared sensor 112 is positioned to allow the infrared sensor 112 to measure temperature values of the flow cell support 104 and/or the flow cell interface 102. The stage assembly 116 can move the flow cell interface 102 and the flow cell support 104 relative to the infrared sensor 112 to allow the temperature values to be obtained.

A bracket 130 is shown coupling the infrared sensor 112 and the imaging system 114. The bracket 130 may have apertures that allow the infrared sensor 112 to be attached to the bracket 130. The bracket 130 may also or alternatively be an L-shaped bracket. Other ways of coupling the infrared sensor 112 and the imaging system 114 may prove suitable, however. The infrared sensor 112 may alternatively be coupled in a different location.

The controller 124 can also calibrate the infrared sensor 112. The system 100 may calibrate the infrared sensor 112 prior to calibrating the temperature control device 110, on a different schedule, and/or at any time. The system 100 includes a temperature sensor 132 to do so. The temperature sensor 132 may be a digital temperature sensor such as a ADT7422. Other temperature sensors 132 may prove suitable. The flow cell 108 may alternatively carry the temperature sensor 132 in other implementations. The flow cell 108 may be a considered a mock flow cell in implementations when the flow cell 108 carries the temperature sensor 132. The mock flow cell may be used for testing and/or calibration purposes as an example.

The flow cell interface 102 includes a flow cell deck 134 that carries the flow cell support 104 and to which the temperature sensor 132 is coupled in the implementation shown. The temperature sensor 132 can be coupled in different locations, however.

The infrared sensor 112 measures a first temperature value adjacent to the temperature sensor 132, the temperature sensor 132 measures a second temperature value, and the controller 124 calibrates the infrared sensor 112 based on a difference between the first temperature value and the second temperature value. The controller 124 can calibrate the infrared sensor 112 by offsetting the measurements of the infrared sensor 112 or revising the settings of the infrared sensor 112.

The temperature sensor 132 may be a part of a calibration assembly 135 that includes the temperature sensor 132 and a printed circuit board 136. The printed circuit board 136 is shown coupled to the temperature sensor 132 and positioned between the temperature sensor 132 and the flow cell deck 134. The temperature sensor 132 and/or the printed circuit board 136 may be in another positon, however. The temperature sensor 132 may be coupled to the flow cell support 104 and the printed circuit board 136 such that the temperature sensor 132 is positioned between the flow cell support 104 and the printed circuit board 136, for example (see, for example, FIG. 5).

The calibration assembly 135 may also include a metallic layer 138. The metallic layer 138 is shown covering a surface 140 of the temperature sensor 132. The infrared sensor 112 can, thus, measure the first temperature value at the metallic layer 138 when the infrared sensor 112 is being calibrated. The metallic layer 138 may include aluminum. The metallic layer 138 can include additional or alternative materials, however. Thermally conductive epoxy 142 couples the temperature sensor 132 and the metallic layer 138. The temperature sensor 132 can measure the second temperature value at the metallic layer 138 relatively accurately as a result of the presence of the thermally conductive epoxy 142.

The metallic layer 138 and a surface 139 of the flow cell support 104 can have substantially similar emissivity such as having similar surface finishes. The surface 139 of the flow cell support 104 can include a metallic layer.

The stage assembly 116 includes an x-stage 144 and a y-stage 146. The x-stage 144 moves the flow cell interface 102 in an x-direction relative to the imaging system 114 and the infrared sensor 112 and the y-stage 146 moves the flow cell interface 102 in the y-direction relative to the imaging system 114 and the infrared sensor 112. The x-stage 144 and/or the y-stage 146 may be linear stages. The x-stage 144 and/or the y-stage 146 may be any other type of motor or actuator, however. The stage assembly 116 can move the flow cell support 104 to different locations to allow the infrared sensor 112 to measure one or more temperature values of the flow cell support 104, for example.

Referring still to the system 100 of FIG. 1, the system 100 also includes a sipper manifold assembly 148, a sample loading manifold assembly 150, a pump manifold assembly 152, a drive assembly 154, and a waste reservoir 156 in the implementation shown. The controller 124 is electrically and/or communicatively coupled to the sipper manifold assembly 148, the sample loading manifold assembly 150, the pump manifold assembly 152, and the drive assembly 154 and is adapted to cause the sipper manifold assembly 148, the sample manifold assembly 150, the pump manifold assembly 152, and the drive assembly 154 to perform various functions as disclosed herein.

Referring to the flow cell 108, each of the flow cells 108 includes a plurality of channels 158 in the implementation shown, each having a first channel opening positioned at a first end of the flow cell 108 and a second channel opening positioned at a second end of the flow cell 108. Depending on the direction of flow through the channels 158, either of the channel openings may act as an inlet or an outlet. While the flow cell 108 is shown including two channels 158 in FIG. 1, any number of channels 158 may be included (e.g., 1, 2, 6, 8).

The flow cell assembly 106 also includes a flow cell frame 160 and a flow cell manifold 162 coupled to the first end of the corresponding flow cell 108. As used herein, a "flow cell" (also referred to as a flowcell) can include a device having a lid extending over a reaction structure to form a flow channel therebetween that is in communication with a plurality of reaction sites of the reaction structure. Some flow cells may also include a detection device that detects designated reactions that occur at or proximate to the reaction sites. As shown, the flow cell 108, the flow cell manifold 162, and/or any associated gaskets used to establish a fluidic connection between the flow cell 108 and the system 100 are coupled or otherwise carried by the flow cell frame 160. While the flow cell frame 160 is shown included with the flow cell assembly 106 of FIG. 1, the flow cell frame 160 may be omitted. As such, the flow cell 108 and the associated flow cell manifold 162 and/or gaskets may be used with the system 100 without the flow cell frame 160.

Prior to referring to some of the additional components of the system 100 of FIG. 1 such as some of the fluidic components, it is noted that while some components of the system 100 are shown once and coupled to the single flow cell 108, in some implementations, these components may be duplicated, thereby allowing more flow cells 108 to be used with the system 100 (e.g., 2, 3, 4) and each flow cell 108 can have its own corresponding components as a result. Each flow cell 108 may be associated with a separate sample cartridge 164, sample loading manifold assembly 150, pump manifold assembly 152, etc. when more than one flow cell 108 is included with the system 100.

Referring now to the sample cartridge 164, the sample loading manifold assembly 150, and the pump manifold assembly 152, the system 100 includes a sample cartridge receptacle 166 that receives the sample cartridge 164 that carries one or more samples of interest (e.g., an analyte) in the implementation shown. The system 100 also includes a sample cartridge interface 168 that establishes a fluidic connection with the sample cartridge 164.

The sample loading manifold assembly 150 includes one or more sample valves 170 and the pump manifold assembly 152 includes one or more pumps 172, one or more pump valves 174, and a cache 176. One or more of the valves 170, 174 may be implemented by a rotary valve, a pinch valve, a flat valve, a solenoid valve, a check valve, a piezo valve, and/or a three-way valve. However, different types of fluid control devices may be used. One or more of the pumps 172 may be implemented by a syringe pump, a peristaltic pump, and/or a diaphragm pump. Other types of fluid transfer devices may be used, however. The cache 176 may be a serpentine cache and may temporarily store one or more reaction components during bypass manipulations of the system 100 of FIG. 1. While the cache 176 is shown being included in the pump manifold assembly 152, in another implementation, the cache 176 may be located in a different location. In certain implementations, the cache 176 may be included in the sipper manifold assembly 148 or in another manifold downstream of a bypass fluidic line 178.

The sample loading manifold assembly 150 and the pump manifold assembly 152 flow one or more samples of interest from the sample cartridge 164 through a fluidic line 180 toward the flow cell assembly 106. In some implementations, the sample loading manifold assembly 150 can individually load/address each channel 158 of the flow cell 108 with a sample of interest. The process of loading the channels 158 of the flow cell 108 with a sample of interest may occur automatically using the system 100 of FIG. 1.

The sample cartridge 164 and the sample loading manifold assembly 150 are positioned downstream of the flow cell assembly 106 in the system 100 of FIG. 1. The sample loading manifold assembly 150 may load a sample of interest into the flow cell 108 from the rear of the flow cell 108. Loading a sample of interest from the rear of the flow cell 108 may be referred to as "back loading." Back loading the sample of interest into the flow cell 108 may reduce contamination. The sample loading manifold assembly 50 is coupled between the flow cell assembly 106 and the pump manifold assembly 52.

To draw a sample of interest from the sample cartridge 164 and toward the pump manifold assembly 152, the sample valves 170, the pump valves 174, and/or the pumps 172 may be selectively actuated to urge the sample of interest toward the pump manifold assembly 152. The sample cartridge 164 may include a plurality of sample reservoirs that are selectively fluidically accessible via the corresponding sample valve 170. Each sample reservoir can thus be selectively isolated from other sample reservoirs using the corresponding sample valves 170.

To individually flow the sample of interest toward a corresponding channel of one of the flow cells 108 and away from the pump manifold assembly 152, the sample valves 170, the pump valves 174, and/or the pumps 172 can be selectively actuated to urge the sample of interest toward the flow cell assembly 106 and into the respective channels 58 of the corresponding flow cell 108. Each channel 158 of the flow cell 108 receives the sample of interest in some implementations. In other implementations, one or more of the channels 158 of the flow cell(s) 108 selectively receives the sample of interest and others of the channels 158 of the flow cell(s) 108 do not receive the sample of interest. The channels 158 of the flow cell(s) 108 that may not receive the sample of interest may receive a wash buffer instead.

The drive assembly 154 interfaces with the sipper manifold assembly 148 and the pump manifold assembly 152 to flow one or more reagents that interact with the sample within the corresponding flow cell 108. In an implementation, a reversible terminator is attached to the reagent to allow a single nucleotide to be incorporated onto a growing DNA strand. One or more of the nucleotides has a unique fluorescent label that emits a color when excited in some such implementations. The color (or absence thereof) is used to detect the corresponding nucleotide. The imaging system 114 excites one or more of the identifiable labels (e.g., a fluorescent label) in the implementation shown and thereafter obtains image data for the identifiable labels. The labels may be excited by incident light and/or a laser and the image data may include one or more colors emitted by the respective labels in response to the excitation. The image data (e.g., detection data) may be analyzed by the system 100. The imaging system 114 may be a fluorescence spectrophotometer including an objective lens and/or a solid-state imaging device. The solid-state imaging device may include a charge coupled device (CCD) and/or a complementary metal oxide semiconductor (CMOS). Other types of imaging systems and/or optical instruments may be used, however. The imaging system 114 may be or may be associated with a scanning electron microscope, a transmission electron microscope, an imaging flow cytometer, high-resolution optical microscopy, confocal microscopy, epifluorescence microscopy, two photon microscopy, differential interference contrast microscopy, etc. in certain implementations.

After the image data is obtained, the drive assembly 154 interfaces with the sipper manifold assembly 148 and the pump manifold assembly 152 to flow another reaction component (e.g., a reagent) through the flow cell 108 that is thereafter received by the waste reservoir 156 via a primary waste fluidic line 182 and/or otherwise exhausted by the system 100. Some reaction components perform a flushing operation that chemically cleaves the fluorescent label and the reversible terminator from the sstDNA. The sstDNA is then ready for another cycle.

The primary waste fluidic line 182 is coupled between the pump manifold assembly 152 and the waste reservoir 156. The pumps 172 and/or the pump valves 174 of the pump manifold assembly 152 selectively flow the reaction components from the flow cell assembly 106, through the fluidic line 180 and the sample loading manifold assembly 150 to the primary waste fluidic line 182 in some implementations.

The flow cell assembly 106 is coupled to a central valve 184 via the flow cell interface 102. An auxiliary waste fluidic line 186 is coupled to the central valve 184 and to the waste reservoir 156. The auxiliary waste fluidic line 186 receives excess fluid of a sample of interest from the flow cell assembly 106 in some implementations, via the central valve 184, and flows the excess fluid of the sample of interest to the waste reservoir 156 when back loading the sample of interest into the flow cell 108, as described herein. That is, the sample of interest may be loaded from the rear of the flow cell 108 and any excess fluid for the sample of interest may exit from the front of the flow cell 108. By back loading samples of interest into the flow cell 108, different samples can be separately loaded to corresponding channels 158 of the corresponding flow cell 108 and the single flow cell manifold 162 can couple the front of the flow cell 108 to the central valve 184 to direct excess fluid of each sample of interest to the auxiliary waste fluidic line 186. Once the samples of interest are loaded into the flow cell 108, the flow cell manifold 162 can be used to deliver common reagents from the front of the flow cell 108 (e.g., upstream) for each channel 158 of the flow cell 108 that exit from the rear of the flow cell 108 (e.g., downstream). Put another way, the sample of interest and the reagents may flow in opposite directions through the channels 158 of the flow cell 108.

Referring to the sipper manifold assembly 148, the sipper manifold assembly 148 includes a shared line valve 188 and a bypass valve 190 in the implementation shown. The shared line valve 188 may be referred to as a reagent selector valve. The valve 120 of the reagent selector valve assembly 118, the central valve 184, and/or the valves 188, 190 of the sipper manifold assembly 148 may be selectively actuated to control the flow of fluid through fluidic lines 178, 192, 194, 196, 198. One or more of the valves 120, 170, 174, 184, 188 may be implemented by a rotary valve, a pinch valve, a flat valve, a solenoid valve, a check valve, a piezo valve, and/or a three-way valve. Other fluid control devices may prove suitable.

The sipper manifold assembly 148 may be coupled to a corresponding number of reagents reservoirs 200 via reagent sippers 202. The reagent reservoirs 200 may contain fluid (e.g., reagent and/or another reaction component). The sipper manifold assembly 148 includes a plurality of ports in some implementations. Each port of the sipper manifold assembly 148 may receive one of the reagent sippers 202. The reagent sippers 202 may be referred to as fluidic lines. While the system 100 includes the sipper manifold assembly 148, the system 100 may alternatively receive a reagent cartridge and, thus, the sipper manifold assembly 148 may be modified to omit the reagent sippers 202 and/or to include an alternative fluidic interface, for example, or the sipper manifold assembly 148 may be omitted.

The shared line valve 188 of the sipper manifold assembly 148 is coupled to the central valve 184 via the shared reagent fluidic line 192. Different reagents may flow through the shared reagent fluidic line 192 at different times. In an implementation, the pump manifold assembly 152 may draw wash buffer through the shared reagent fluidic line 192, the central valve 184, and the corresponding flow cell assembly 106 when performing a flushing operation before changing between one reagent and another. The shared reagent fluidic line 192 may, thus, be involved in the flushing operation. While one shared reagent fluidic line 192 is shown, any number of shared fluidic lines may be included in the system 100.

The bypass valve 190 of the sipper manifold assembly 148 is coupled to the central valve 184 via the reagent fluidic lines 194, 196. The central valve 184 may have one or more ports that correspond to the reagent fluidic lines 194, 196.

The dedicated fluidic lines 198 are coupled between the sipper manifold assembly 148 and the reagent selector valve assembly 118. Each of the dedicated reagent fluidic lines 198 may be associated with a single reagent. The fluids that flow through the dedicated reagent fluidic lines 198 may be used during sequencing operations and may include a cleave reagent, an incorporation reagent, a scan reagent, a cleave wash, and/or a wash buffer. Because only a single reagent may flow through each of the dedicated reagent fluidic lines 198, the dedicated reagent fluidic lines 198 themselves may not be flushed when performing a flushing operation before changing between one reagent and another. The approach of including dedicated reagent fluidic lines 198 may be helpful when the system 100 uses reagents that may have adverse reactions with other reagents. Reducing a number of fluidic lines or a length of the fluidic lines that are flushed when changing between different reagents moreover reduces reagent consumption and flush volume and may decrease cycle times of the system 100. While two dedicated reagent fluidic lines 198 are shown, any number of dedicated fluidic lines may be included in the system 100.

The bypass valve 190 is also coupled to the cache 176 of the pump manifold assembly 152 via the bypass fluidic line 178. One or more reagent priming operations, hydration operations, mixing operations, and/or transfer operations may be performed using the bypass fluidic line 178. The priming operations, the hydration operations, the mixing operations, and/or the transfer operations may be performed independent of the flow cell assembly 106. The operations using the bypass fluidic line 178 may thus occur during incubation of one or more samples of interest within the flow cell assembly 106. That is, the shared line valve 188 can be utilized independently of the bypass valve 190 such that the bypass valve 190 can utilize the bypass fluidic line 178 and/or the cache 176 to perform one or more operations while the shared line valve 188 and/or the central valve 184 simultaneously, substantially simultaneously, or offset synchronously perform other operations. The system 100 can thus perform multiple operations at once, thereby reducing run time.

Referring now to the drive assembly 154, in the implementation shown, the drive assembly 154 includes a pump drive assembly 204 and a valve drive assembly 206. The pump drive assembly 204 may be adapted to interface with the one or more pumps 172 to pump fluid through the flow cell 108 and/or to load one or more samples of interest into the flow cell 108. The valve drive assembly 206 may be adapted to interface with one or more of the valves 120, 170, 174, 184, 188, 190 to control the position of the corresponding valves 120, 170, 174, 184, 188, 190.

Referring to the controller 124, in the implementation shown, the controller 124 includes a user interface 208, a communication interface 210, one or more processors 212, and a memory 214 storing instructions executable by the one or more processors 212 to perform various functions including the disclosed implementations. The user interface 208, the communication interface 133, and the memory 214 are electrically and/or communicatively coupled to the one or more processors 212.

In an implementation, the user interface 208 is adapted to receive input from a user and to provide information to the user associated with the operation of the system 100 and/or an analysis taking place. The user interface 208 may include a touch screen, a display, a key board, a speaker(s), a mouse, a track ball, and/or a voice recognition system. The touch screen and/or the display may display a graphical user interface (GUI).

In an implementation, the communication interface 210 is adapted to enable communication between the system 100 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 212 and/or the system 100 may include one or more of a processor-based system(s) or a microprocessor-based system(s). In some implementations, the one or more processors 212 and/or the system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit, and/or another logic-based device executing various functions including the ones described herein.

The memory 214 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache and/or any other storage device or storage disk in which information is stored for any duration (e.g., permanently, temporarily, for extended periods of time, for buffering, for caching).

Figure 2:
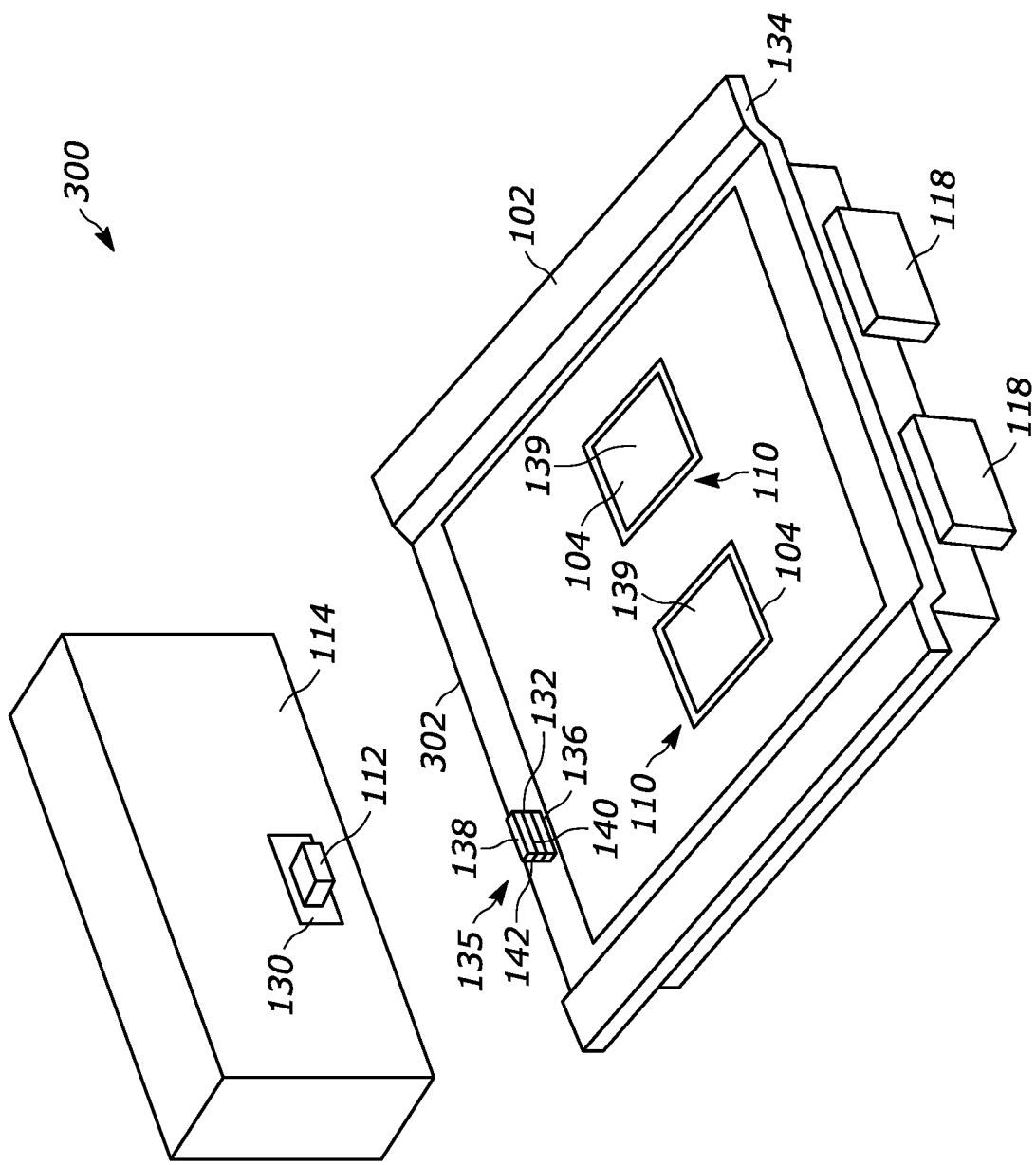
FIG. 2 is an isometric view a flow cell interface that can be used to implement the flow cell interface of FIG. 1 and an isometric view of the imaging system of FIG. 1.

FIG. 2 is an isometric view a flow cell interface 300 that can be used to implement the flow cell interface 102 of FIG. 1 and an isometric view of the imaging system 114 of FIG. 1. The flow cell interface 300 is similar to the flow cell interface 102 of FIG. 1. The flow cell interface 300 of FIG. 2, however, includes a pair of flow cell supports 104 and a pair of temperature control devices 110 as a result. While two flow cell supports 104 are shown, any number of flow cell supports 104 can be included.

The flow cell interface 300 has a bordering structure 302 adjacent to the flow cell supports 104 and the printed circuit board 136 is shown coupled to the bordering structure 230. The printed circuit board 136 is positioned between the temperature sensor 132 and the flow cell interface 102 and the metallic layer 138 extends over and covers at least a portion of the surface 140 of the temperature sensor 132. The metallic layer 138 is a metal cap disposed on the temperature sensor 132 in the implementation shown. The metallic layer 138 can be about a 4×4×4 mm piece of aluminum. The metallic layer 138 may, however, be any other size and be made of another material.

The temperature sensor 132, the printed circuit board 136, and/or the metallic layer 138, can be at ambient temperature because they are spaced from the temperature control device 110 and, thus, spaced from the flow cell support 104. Less temperature gradients may be present between the temperature sensor 132, the printed circuit board 136, and the metallic layer 138 as a result. The infrared sensor 112 may be calibrated more accurately because the components 132, 136, 138 are at ambient temperature. Put another way, a position of the components 132, 136, 138 on the bordering structure 302 reduces an amount that the temperature control device 110 affects a temperature of the components 132, 136, 138.

The metallic layer 138 and the temperature sensor 132 can also have a low total heat content and good thermal conductivity that allows the metallic layer 138 and the temperature sensor 132 to quickly track changes in ambient air temperature to maintain consistent measurements and calibrations. Temperature readings from the temperature sensor 132 can be relied on to be accurate within about 0.15 degree C. for the life of the temperature sensor 132 due to the lack of temperature cycling impacting the thermal bond between the temperature sensor 132 and the metallic layer 138 and the temperature sensor 132 using a semiconductor bandgap.

Figure 3:
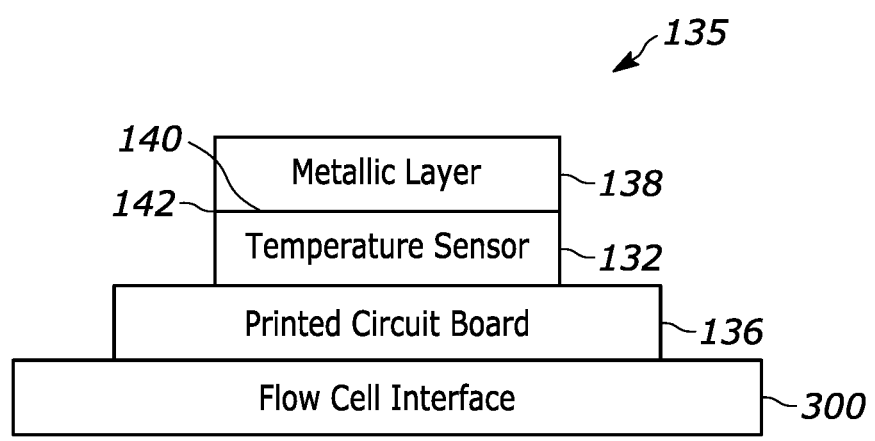
FIG. 3 is a cross-sectional schematic view of a portion of a flow cell interface of FIG. 2 showing the printed circuit board positioned between the temperature sensor and the flow cell interface.

FIG. 3 is a cross-sectional schematic view of a portion of the flow cell interface 300 of FIG. 2 showing the printed circuit board 136 positioned between the temperature sensor 132 and the flow cell interface 102. The metallic layer 138 extends over and covers at least a portion of the surface 140 of the temperature sensor 132.

Figure 4:
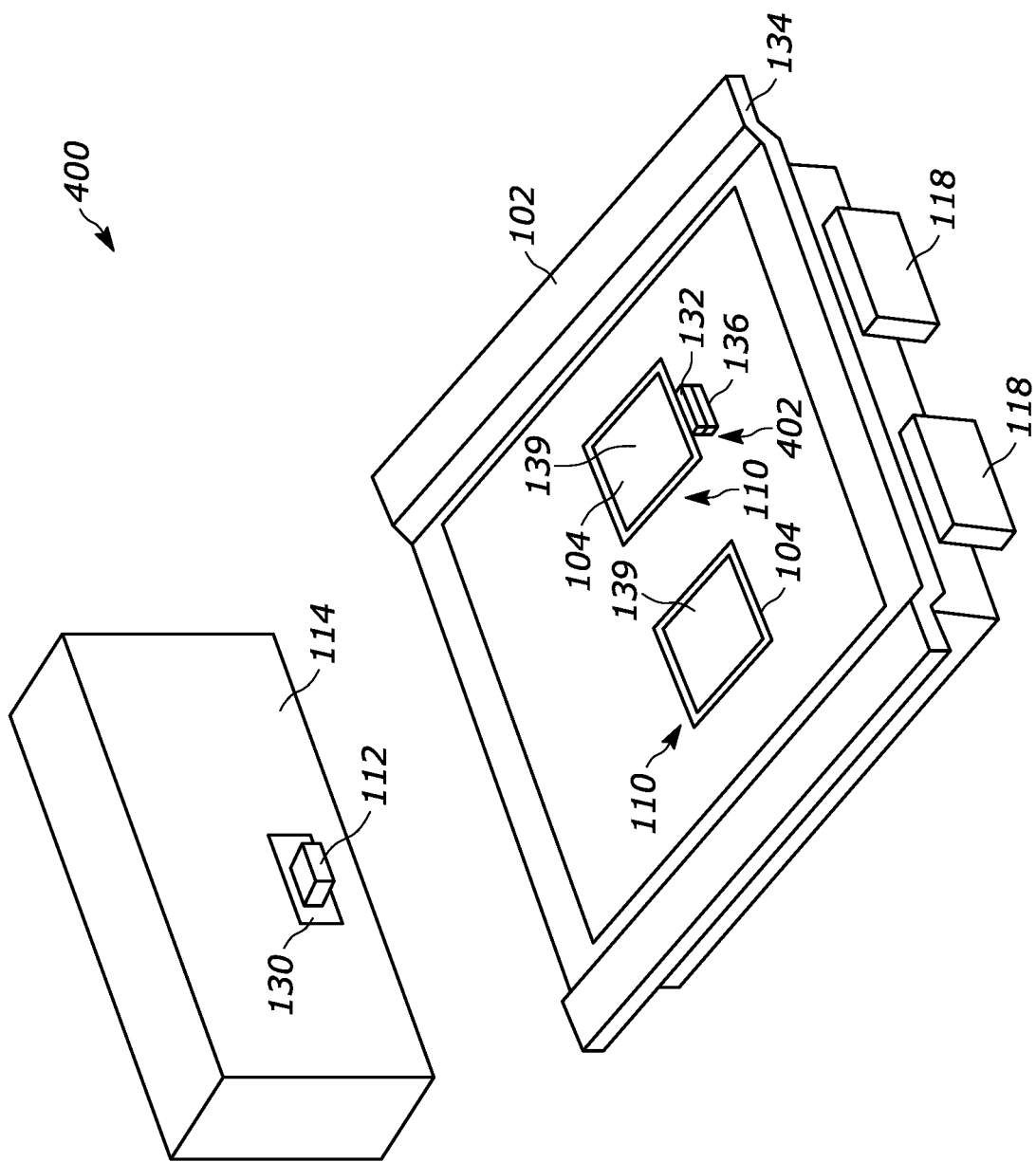
FIG. 4 is an isometric view of another flow cell interface that can be used to implement the flow cell interface of FIG. 1 and an isometric schematic view of the imaging system of FIG. 1.

FIG. 4 is an isometric view of another flow cell interface 400 that can be used to implement the flow cell interface 102 of FIG. 1 and an isometric schematic view of the imaging system 114 of FIG. 1. The flow cell interface 400 is similar to the flow cell interface 300 of FIG. 2. The flow cell interface 400 of FIG. 4, however, includes the temperature sensor 132 coupled to the flow cell support 104 instead of being coupled to the flow cell interface 102. The temperature sensor 132 is, thus, not spaced from the flow cell support 104 in FIG. 4. The position of the temperature sensor 132 allows the temperature sensor 132 to measure a temperature of the flow cell support 104 instead of measuring a temperature at the metallic layer 138.

The infrared sensor 112 (FIG. 1) measures a first temperature value of the flow cell support 104 during a calibration procedure of the infrared sensor 112 in the implementation shown and the temperature sensor 132 can measure a second temperature value at the flow cell support 104. The controller 124 of the system 100 of FIG. 1 can calibrate the infrared sensor 112 based on a difference between the first temperature value and the second temperature value in some implementations.

The temperature sensor 132 may be a part of a calibration assembly 402 that includes the temperature sensor 132 and the printed circuit board 136. The printed circuit board 136 is shown coupled to the temperature sensor 132. The temperature sensor 132 is positioned between the printed circuit board 136 and the flow cell deck 134.

Figure 5:
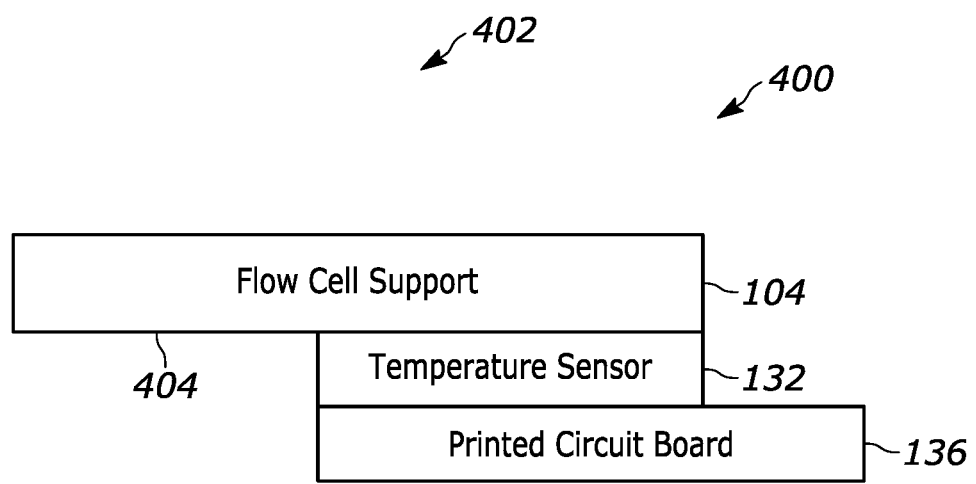
FIG. 5 is a cross-sectional schematic view of a portion of the flow cell interface of FIG. 4 showing a temperature sensor coupled to a lower surface of a flow cell support of the flow cell interface.

FIG. 5 is a cross-sectional schematic view of a portion of the flow cell interface 400 of FIG. 4 showing the temperature sensor 132 coupled to a lower surface 404 of the flow cell support 104. The printed circuit board 136 is positioned between the temperature sensor 132 and the flow cell interface 102.

Figure 6:
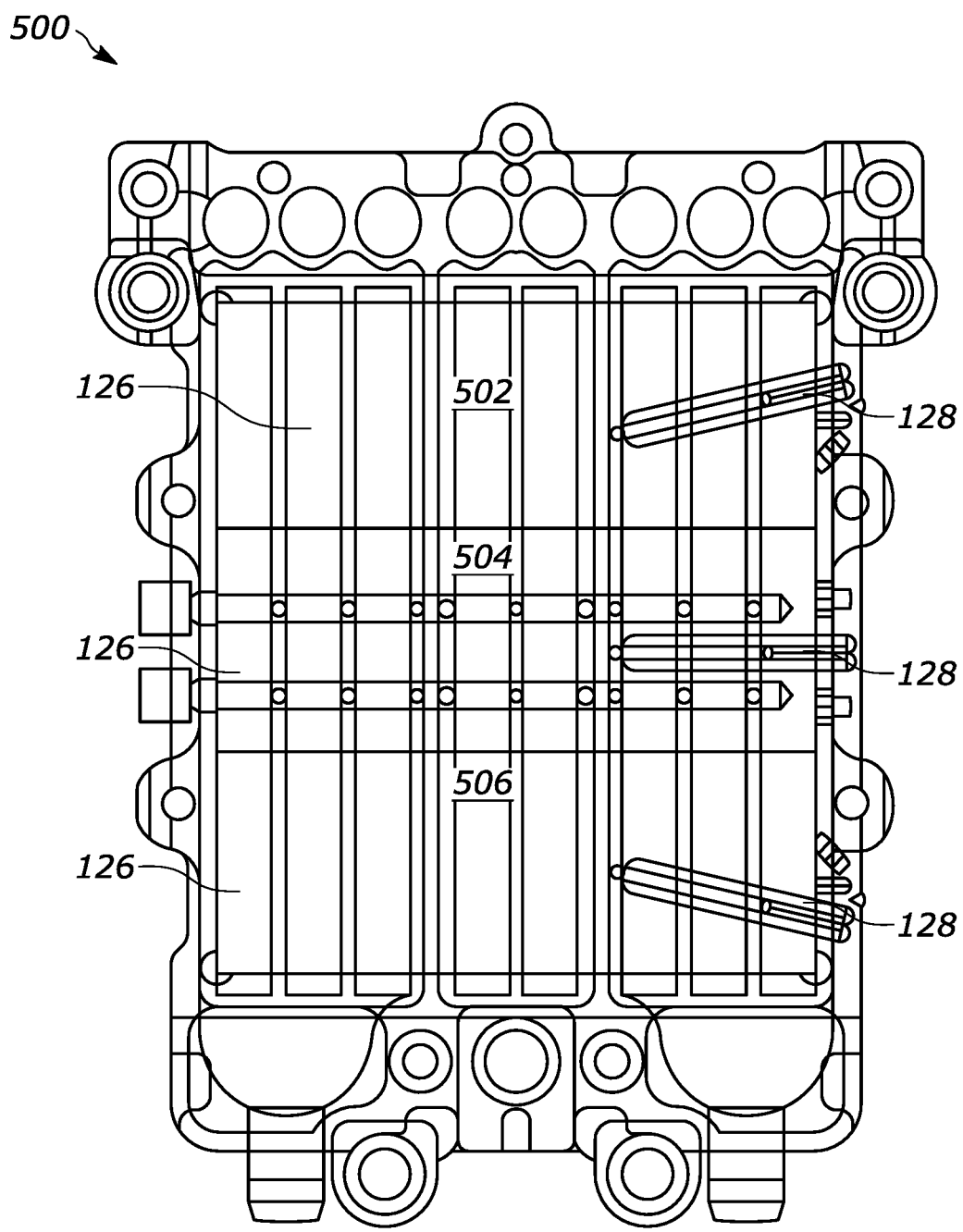
FIG. 6 is a top plan view of a temperature control device that can be used to implement the temperature control device of FIG. 1.

FIG. 6 is a top plan view of a temperature control device 500 that can be used to implement the temperature control device 110 of FIG. 1. The temperature control device 500 of FIG. 5 includes the first zone 502, the second zone 504, and the third zone 506. Each of the zones 502, 504, 506 has a corresponding thermoelectric cooler 126 and a corresponding resistance temperature detector 128. The thermoelectric coolers 126 heat and/or cool the corresponding zone 502, 504, 506 and the resistance temperature detectors 128 are positioned to measure a temperature in the corresponding zone 502, 504, 506. The resistance temperature detectors 128 allow the controller 124 to access the measured temperature values through a feedback loop that allows the commanded temperatures to be achieved. One of the thermoelectric coolers 126 may control a temperature of more than one of the zones 502, 504, 506, however.

FIGS. 7, 8, 9, and 10 illustrate flowcharts for processes 700, 800, 900, 100 of calibrating the temperature control devices 110, 500 of FIGS. 1, 2, 4, and 6 and the infrared sensors 112 of FIGS. 1, 2, and 4 or any of the other implementations disclosed herein. The order of execution of the blocks may be changed, and/or some of the blocks described may be changed, eliminated, combined and/or subdivided into multiple blocks. The processes 700, 800, 900, and/or 1000 can be performed individually or performed serially in any order.

Figure 7:
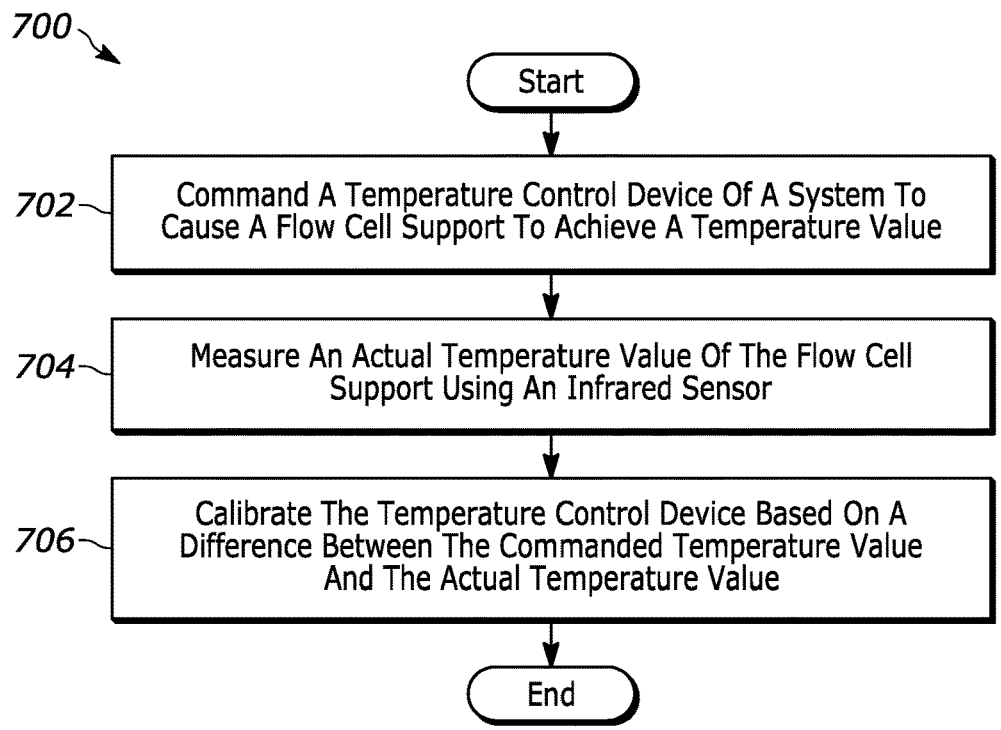
FIG. 7 illustrates a flowchart for a process of calibrating the temperature control devices of FIGS. 1, 2, 4, and 6 or any of the other implementations disclosed herein.

The process 700 of FIG. 7 begins with the temperature control device 110 of the system 100 being commanded to cause the flow cell support 104 to achieve a temperature value (Block 702). The temperature control device 110 can be commanded to cause the flow cell support 104 to achieve the temperature value in some implementations by commanding the thermoelectric cooler 126 to cause the flow cell support 104 to achieve the temperature value and the resistance temperature detector 128 measuring the temperature value.

An actual temperature value of the flow cell support 104 is measured using the infrared sensor 112 (Block 704). The actual temperature value for the flow cell support 104 is measured using the infrared sensor 112 in some implementations while moving the flow cell interface 102 relative to the infrared sensor 112.

The temperature control device 110 is calibrated based on a difference between the commanded temperature value and the actual temperature value (Block 706). The temperature control device 110 is calibrated in some implementations in responsive to receiving a command at the controller 124 to calibrate the temperature control device 110. The controller 124 can receive the command from a remote computing device and/or from user input received at the user interface 208 of the system 100.

Figure 8:
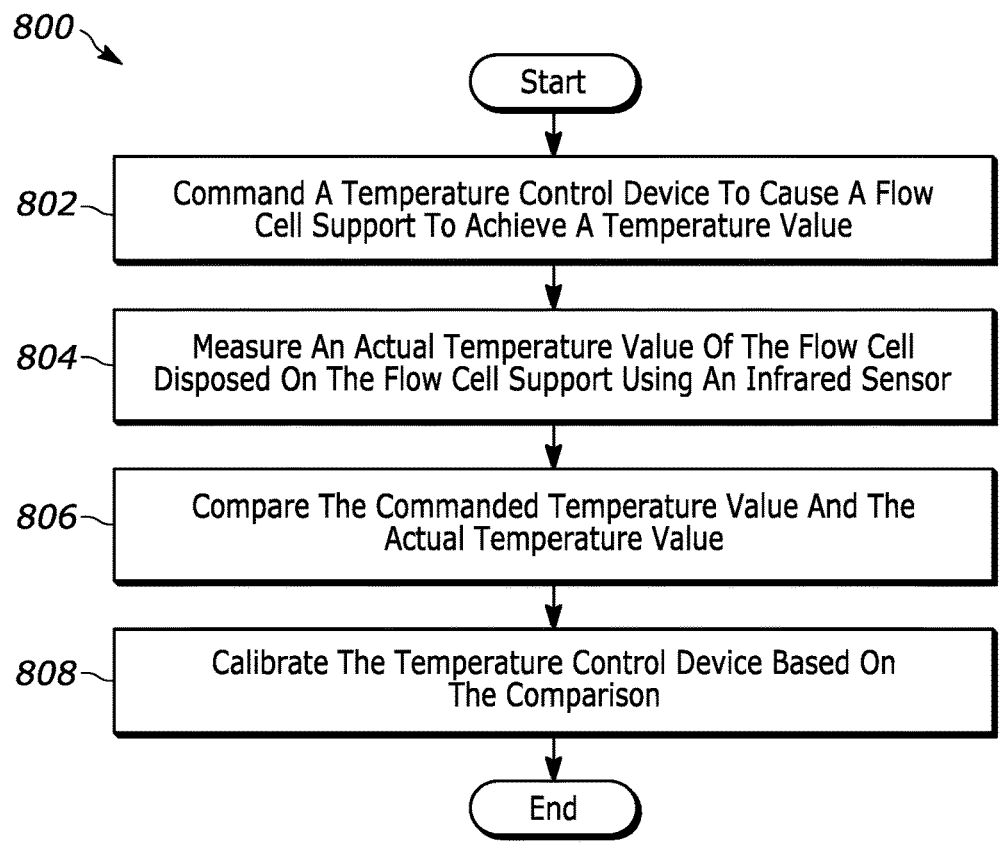
FIG. 8 illustrates another flowchart for a process of calibrating the temperature control devices of FIGS. 1, 2, 4, and 6 or any of the other implementations disclosed herein.

The process 800 of FIG. 8 begins with temperature control device 110 being commanded to cause the flow cell support 104 to achieve a temperature value (Block 802). The flow cell 108 may be disposed on the flow cell support 104 and no sample and/or reagent may be contained within the flow cell 108. An actual temperature value of the flow cell 108 disposed on the flow cell support 104 is measured using the infrared sensor 112 (Block 804) and the commanded temperature value and the actual temperature value are compared (Block 806). The temperature control device 110 is calibrated based the comparison (Block 808). The controller 124 can account for a difference between the temperature determined by the resistance temperature detectors 128 at the temperature control device 110 and the temperature determined by the thermoelectric device 110 at the flow cell 108 when calibrating the temperature control device 110.

Figure 9:
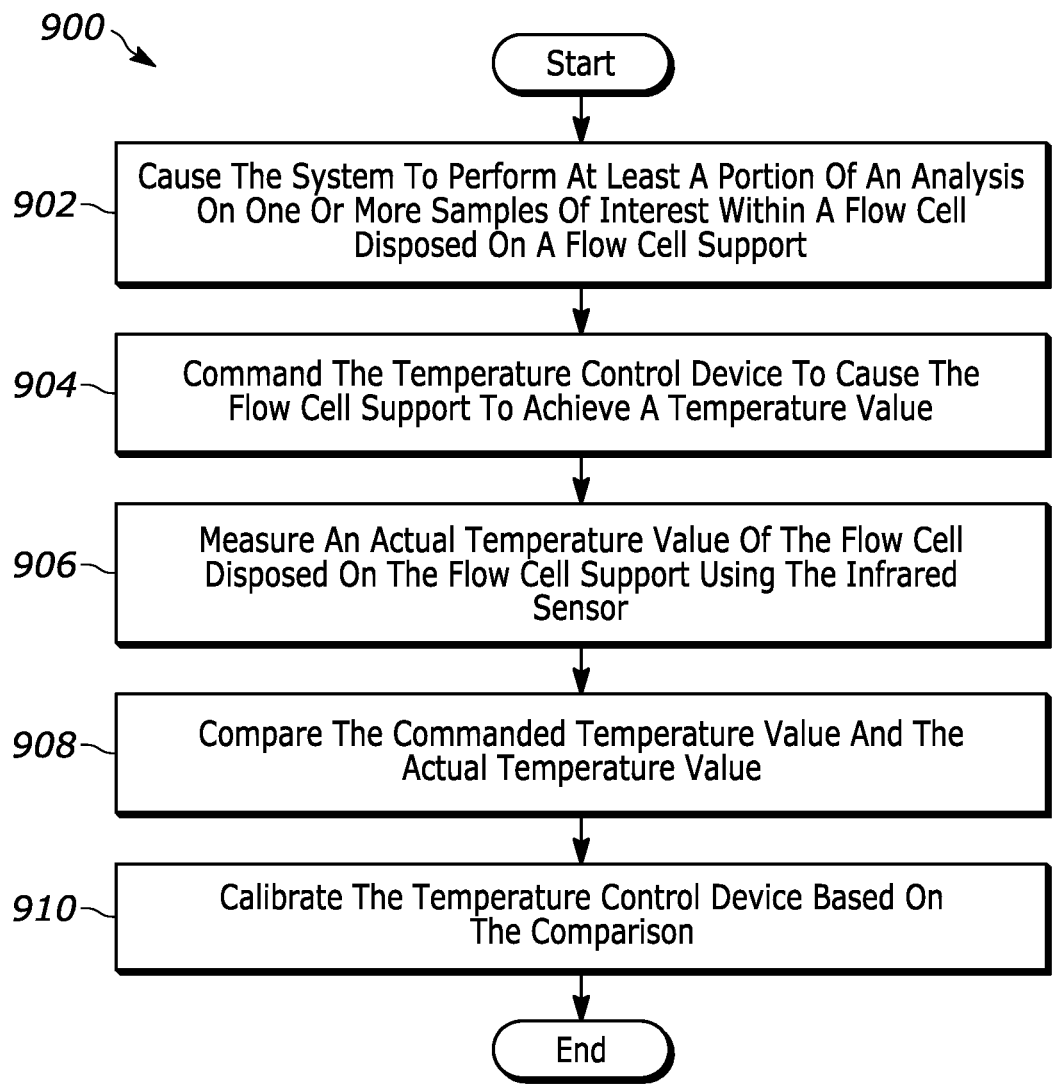
FIG. 9 illustrates another flowchart for a process of calibrating the temperature control devices of FIGS. 1, 2, 4, and 6 or any of the other implementations disclosed herein.

The process 900 of FIG. 9 begins with the system 100 being caused to perform at least a portion of an analysis on one or more samples of interest within the flow cell 108 disposed on the flow cell support 104 (Block 902). The temperature control device 110 is commanded to cause the flow cell support 104 to achieve a temperature value (Block 904). An actual temperature value of the flow cell 108 disposed on the flow cell support 104 is measured using the infrared sensor 112 (Block 906) and the commanded temperature value and the actual temperature value are compared (Block 908). The temperature control device 110 is calibrated based the comparison (Block 910).

Figure 10:
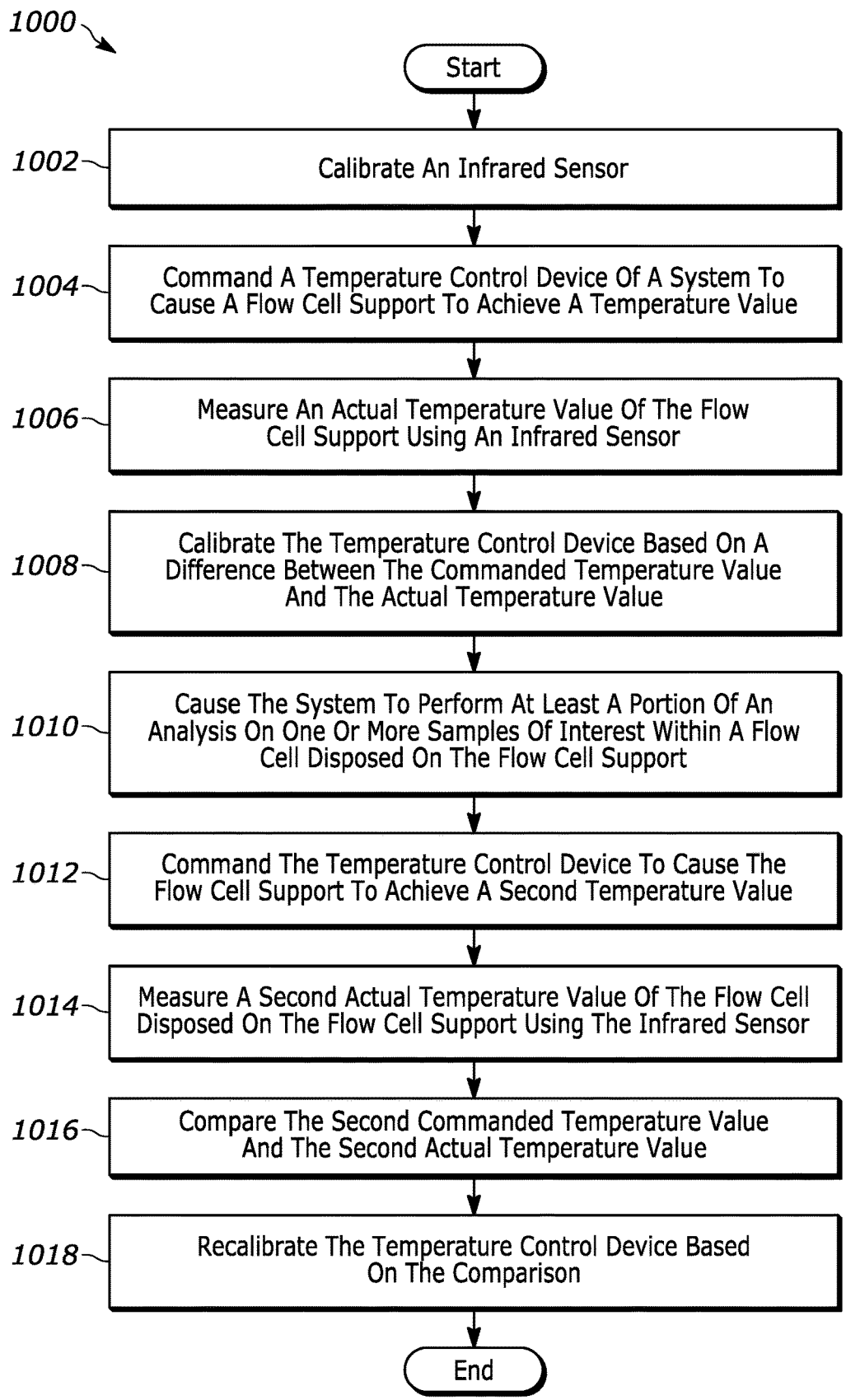
FIG. 10 illustrates a flowchart for a process of calibrating the temperature control devices of FIGS. 1, 2, 4, and 6 and the infrared sensors of FIGS. 1, 2, and 4 or any of the other implementations disclosed herein.

The process 1000 of FIG. 10 begins with the infrared sensor 112 being calibrated (Block 1002). The infrared sensor 112 can be calibrated by generating data associated with the difference between the first temperature value and the second temperature value and calibrating the infrared sensor 112 with the controller 124 based on the data.

The infrared sensor 112 is calibrated in some implementations by measuring a first temperature value adjacent to the temperature sensor 132 carried by the flow cell interface 102 using the infrared sensor 112, measuring a second temperature value using the temperature sensor 132, and calibrating the infrared sensor 112 with the controller 124 based on a difference between the first temperature value and the second temperature value. The infrared sensor 112 is calibrated in other implementation by measuring a first temperature value of the flow cell support 104 using the infrared sensor 112, measuring a second temperature value at the flow cell support 104 using the temperature sensor 132, and calibrating the infrared sensor 112 with the controller 124 based on a difference between the first temperature value and the second temperature value. The temperature sensor 132 may be carried by the flow cell support 104 in the second implementation mentioned. The infrared sensor 112 can be calibrated in response to receiving a command at the controller 124 to calibrate the infrared sensor 112. The command can be received from a remote computing device and/or from user input received at the user interface 208 of the system 100.

The temperature control device 110 of the system 100 is commanded to cause the flow cell support 104 to achieve a temperature value (Block 1004). The temperature control device 110 can be commanded to cause the flow cell support 104 to achieve the temperature value in some implementations by commanding the thermoelectric cooler 126 to cause the flow cell support 104 to achieve the temperature value and the resistance temperature detector 128 measuring the temperature value.

An actual temperature value of the flow cell support 104 is measured using the infrared sensor 112 (Block 1006). The actual temperature value for the flow cell support 104 is measured using the infrared sensor 112 in some implementations while moving the flow cell interface 102 relative to the infrared sensor 112.

The temperature control device 110 is calibrated based on a difference between the commanded temperature value and the actual temperature value (Block 1008). The temperature control device 110 is calibrated in some implementations in responsive to receiving a command at the controller 124 to calibrate the temperature control device 110. The controller 124 can receive the command from a remote computing device and/or from user input received at the user interface 208 of the system 100.

The system 100 is caused to perform at least a portion of an analysis on one or more samples of interest within the flow cell 108 disposed on the flow cell support 104 (Block 1010). The temperature control device 110 is commanded to cause the flow cell support 104 to achieve a second temperature value (Block 1012). A second actual temperature value of the flow cell 108 disposed on the flow cell support 104 is measured using the infrared sensor 112 (Block 1014) and the second commanded temperature value and the second actual temperature value are compared (Block 1016). The temperature control device 110 is recalibrated based the comparison (Block 1018).

In particular implementations, methods, and optical systems described herein may be used for sequencing nucleic acids. Sequencing-by-synthesis (SBS) protocols are particularly applicable, for example. In SBS, a plurality of fluorescently labeled modified nucleotides are used to sequence dense clusters of amplified DNA (possibly millions of clusters) present on the surface of an optical substrate (e.g., a surface that at least partially defines a channel in a flow cell). The flow cells may contain nucleic acid samples for sequencing where the flow cells are placed within the appropriate flow cell holders. The samples for sequencing can take the form of single nucleic acid molecules that are separated from each other so as to be individually resolvable, amplified populations of nucleic acid molecules in the form of clusters or other features, or beads that are attached to one or more molecules of nucleic acid. The nucleic acids can be prepared such that they comprise an oligonucleotide primer adjacent to an unknown target sequence. To initiate the first SBS sequencing cycle, one or more differently labeled nucleotides, and DNA polymerase, etc., can be flowed into/through the flow cell by a fluid flow subsystem (not shown). Either a single type of nucleotide can be added at a time, or the nucleotides used in the sequencing procedure can be specially designed to possess a reversible termination property, thus allowing each cycle of the sequencing reaction to occur simultaneously in the presence of several types of labeled nucleotides (e.g. A, C, T, G). The nucleotides can include detectable label moieties such as fluorophores. Where the four nucleotides are mixed together, the polymerase is able to select the correct base to incorporate and each sequence is extended by a single base. Non-incorporated nucleotides can be washed away by flowing a wash solution through the flow cell. One or more lasers may excite the nucleic acids and induce fluorescence. The fluorescence emitted from the nucleic acids is based upon the fluorophores of the incorporated base, and different fluorophores may emit different wavelengths of emission light. A deblocking reagent can be added to the flow cell to remove reversible terminator groups from the DNA strands that were extended and detected. The deblocking reagent can then be washed away by flowing a wash solution through the flow cell. The flow cell is then ready for a further cycle of sequencing starting with introduction of a labeled nucleotide as set forth above. The fluidic and detection steps can be repeated several times to complete a sequencing run. Example sequencing methods are described, for example, in Bentley et al., Nature 456:53-59 (2008), WO 04/018497; U.S. Pat. No. 7,057,026; WO 91/06678; WO 07/123,744; U.S. Pat. Nos. 7,329,492; 7,211,414; 7,315,019; 7,405,281, and US 2008/0108082, each of which is incorporated herein by reference.

Optical systems described herein may also be used to scan samples that include microarrays. A microarray may include a population of different probe molecules that are attached to one or more substrates such that the different probe molecules can be differentiated from each other according to relative location. An array can include different probe molecules, or populations of the probe molecules, that are each located at a different addressable location on a substrate. Alternatively, a microarray can include separate optical substrates, such as beads, each bearing a different probe molecule, or population of the probe molecules, that can be identified according to the locations of the optical substrates on a surface to which the substrates are attached or according to the locations of the substrates in a liquid. Exemplary arrays in which separate substrates are located on a surface include, without limitation, a BeadChip Array available from Illumina, Inc. (San Diego, Calif.) or others including beads in wells such as those described in U.S. Pat. Nos. 6,266,459, 6,355,431, 6,770,441, 6,859,570, and 7,622,294; and PCT Publication No. WO 00/63437, each of which is hereby incorporated by reference. Other arrays having particles on a surface include those set forth in US 2005/0227252; WO 05/033681; and WO 04/024328, each of which is hereby incorporated by reference.

An example apparatus, comprising: a flow cell interface including a flow cell support; a temperature control device for the flow cell support; an infrared sensor; and a controller to command the temperature control device to cause the flow cell support to achieve a temperature value, cause the infrared sensor to measure an actual temperature value of the flow cell support, and calibrate the temperature control device based on a difference between the commanded temperature value and the actual temperature value.

The apparatus of any one or more of the preceding embodiments and/or any one or more of the embodiments disclosed below, wherein the temperature control device comprises a thermoelectric cooler.

The apparatus of any one or more of the preceding embodiments and/or any one or more of the embodiments disclosed below, wherein the temperature control device further comprises a resistance temperature detector.

The apparatus of any one or more of the preceding embodiments and/or any one or more of the embodiments disclosed below, wherein the controller is to calibrate the temperature control device by calibrating the resistance temperature detector.

The apparatus of any one or more of the preceding embodiments and/or any one or more of the embodiments disclosed below, further comprising an imaging system, the infrared sensor coupled to the imaging system.

The apparatus of any one or more of the preceding embodiments and/or any one or more of the embodiments disclosed below, further comprising a bracket coupling the infrared sensor to the imaging system.

The apparatus of any one or more of the preceding embodiments and/or any one or more of the embodiments disclosed below, wherein the controller is further to calibrate the infrared sensor.

The apparatus of any one or more of the preceding embodiments and/or any one or more of the embodiments disclosed below, further comprising a temperature sensor; wherein the infrared sensor is to measure a first temperature value adjacent to the temperature sensor; the temperature sensor is to measure a second temperature value; and the controller is to calibrate the infrared sensor based on a difference between the first temperature value and the second temperature value.

The apparatus of any one or more of the preceding embodiments and/or any one or more of the embodiments disclosed below, wherein the flow cell interface further comprises a flow cell deck carrying the flow cell support, the temperature sensor coupled to the flow cell deck.

The apparatus of any one or more of the preceding embodiments and/or any one or more of the embodiments disclosed below, further comprising a printed circuit board coupled to the temperature sensor, the printed circuit board positioned between the temperature sensor and the flow cell deck.

The apparatus of any one or more of the preceding embodiments and/or any one or more of the embodiments disclosed below, further comprising a metallic layer covering a surface of the temperature sensor.

The apparatus of any one or more of the preceding embodiments and/or any one or more of the embodiments disclosed below, wherein the metallic layer and a surface of the flow cell support have substantially similar emissivity.

The apparatus of any one or more of the preceding embodiments and/or any one or more of the embodiments disclosed below, wherein the temperature sensor and the metallic layer are spaced from the flow cell support.

The apparatus of any one or more of the preceding embodiments and/or any one or more of the embodiments disclosed below, wherein the metallic layer comprises aluminum.

The apparatus of any one or more of the preceding embodiments and/or any one or more of the embodiments disclosed below, further comprising thermally conductive epoxy coupling the temperature sensor and the metallic layer.

The apparatus of any one or more of the preceding embodiments and/or any one or more of the embodiments disclosed below, further comprising a temperature sensor; wherein the infrared sensor is to measure a first temperature value of the flow cell support; the temperature sensor is to measure a second temperature value at the flow cell support; and the controller is to calibrate the infrared sensor based on a difference between the first temperature value and the second temperature value.

The apparatus of any one or more of the preceding embodiments and/or any one or more of the embodiments disclosed below, wherein the temperature sensor is coupled to the flow cell support.

The apparatus of any one or more of the preceding embodiments and/or any one or more of the embodiments disclosed below, further comprising a printed circuit board coupled to the temperature sensor, the temperature sensor positioned between the flow cell interface and the printed circuit board.

The apparatus of any one or more of the preceding embodiments and/or any one or more of the embodiments disclosed below, wherein a surface of the flow cell support comprises a metallic layer.

The apparatus of any one or more of the preceding embodiments and/or any one or more of the embodiments disclosed below, wherein the temperature sensor comprises a digital temperature sensor.

A method, comprising: commanding a temperature control device of a system to cause a flow cell support to achieve a temperature value; measuring an actual temperature value of the flow cell support using an infrared sensor; and calibrating the temperature control device based on a difference between the commanded temperature value and the actual temperature value.

The method of any one or more of the preceding embodiments and/or any one or more of the embodiments disclosed below, wherein commanding the temperature control device to cause the flow cell support to achieve the temperature value comprises: commanding a thermoelectric cooler to cause the flow cell support to achieve the temperature value; and measuring the temperature value with one or more resistance temperature detectors.

The method of any one or more of the preceding embodiments and/or any one or more of the embodiments disclosed below, wherein measuring the actual temperature value for the flow cell support using the infrared sensor comprises measuring the actual temperature value for the flow cell support using the infrared sensor while moving the flow cell interface relative to the infrared sensor.

The method of any one or more of the preceding embodiments and/or any one or more of the embodiments disclosed below, further comprising: commanding the temperature control device to cause the flow cell support to achieve a second temperature value; measuring a second actual temperature value of a flow cell disposed on the flow cell support using the infrared sensor; comparing the second commanded temperature value and the second actual temperature value; and recalibrating the temperature control device based the comparison.

The method of any one or more of the preceding embodiments and/or any one or more of the embodiments disclosed below, further comprising: causing the system to perform at least a portion of an analysis on one or more samples of interest within a flow cell disposed on the flow cell support; and commanding the temperature control device to cause the flow cell support to achieve a second temperature value; measuring a second actual temperature value of a flow cell disposed on the flow cell support using the infrared sensor; comparing the second commanded temperature value and the second actual temperature value; and recalibrating the temperature control device based the comparison.

The method of any one or more of the preceding embodiments and/or any one or more of the embodiments disclosed below, wherein calibrating the temperature control device is responsive to receiving a command at the controller to calibrate the temperature control device.

The method of any one or more of the preceding embodiments and/or any one or more of the embodiments disclosed below, wherein receiving the command at the controller to calibrate the temperature control device comprises receiving the command from a remote computing device.

The method of any one or more of the preceding embodiments and/or any one or more of the embodiments disclosed below, wherein receiving the command at the controller to calibrate the temperature control device comprises receiving user input at a user interface of the system.

The method of any one or more of the preceding embodiments and/or any one or more of the embodiments disclosed below, further comprising calibrating the infrared sensor.

The method of any one or more of the preceding embodiments and/or any one or more of the embodiments disclosed below, wherein calibrating the infrared sensor comprises: measuring a first temperature value adjacent to a temperature sensor carried by the flow cell interface using the infrared sensor; measuring a second temperature value using the temperature sensor; and calibrating the infrared sensor with a controller based on a difference between the first temperature value and the second temperature value.

The method of any one or more of the preceding embodiments and/or any one or more of the embodiments disclosed below, wherein calibrating the infrared sensor comprises: measuring a first temperature value of the flow cell support using the infrared sensor; measuring a second temperature value at the flow cell support using a temperature sensor, the temperature sensor being carried by the flow cell support; and calibrating the infrared sensor with the controller based on a difference between the first temperature value and the second temperature value.

The method of any one or more of the preceding embodiments and/or any one or more of the embodiments disclosed below, wherein calibrating the infrared sensor is responsive to receiving a command at the controller to calibrate the infrared sensor.

The method of any one or more of the preceding embodiments and/or any one or more of the embodiments disclosed below, wherein receiving the command at the controller to calibrate the infrared sensor comprises receiving the command from a remote computing device.

The method of any one or more of the preceding embodiments and/or any one or more of the embodiments disclosed below, wherein receiving the command at the controller to calibrate the infrared sensor comprises receiving user input at a user interface of the system.

The method of any one or more of the preceding embodiments and/or any one or more of the embodiments disclosed below, wherein calibrating the infrared sensor comprises generating data associated with the difference between the first temperature value and the second temperature value and calibrating the infrared sensor with the controller based on the data.

The method of any one or more of the preceding embodiments and/or any one or more of the embodiments disclosed below, wherein commanding the temperature control device of the system to cause the flow cell support to achieve the temperature value comprises commanding a first zone of the temperature control device of the system to cause a first zone of the flow cell support to achieve the temperature value and wherein measuring the actual temperature value of the flow cell support using the infrared sensor comprises measuring an actual temperature value of the first zone of the flow cell support.

The method of any one or more of the preceding embodiments and/or any one or more of the embodiments disclosed below, wherein calibrating the temperature control device based on a difference between the commanded temperature value and the actual temperature value comprises calibrating a resistance temperature detector of the first zone of the temperature control device based on a difference between the commanded temperature value and the actual temperature value.

The method of any one or more of the preceding embodiments and/or any one or more of the embodiments disclosed below, further comprising 1) commanding a second zone of the temperature control device of the system to cause a second zone of the flow cell support to achieve a second temperature value; 2) measuring an actual temperature value of the second zone of flow cell support using the infrared sensor; and 3) calibrating a resistance temperature detector of the second zone of the temperature control device based on a difference between the commanded temperature value and the actual temperature value.

A method, comprising: commanding a temperature control device of a system to cause a flow cell support to achieve a temperature value; measuring a plurality of actual temperature value of the flow cell support using an infrared sensor; determining an average actual temperature value based on the plurality of actual temperature values; and calibrating the temperature control device based on a difference between the commanded temperature value and the average actual temperature value.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "substantially," "approximately," and "about" used throughout this Specification are used to describe and account for small fluctuations, such as due to variations in processing. In certain implementations, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus, comprising:
a flow cell interface including a flow cell support adapted to have a flow cell positioned thereon;
a temperature control device for the flow cell support;
an infrared sensor;
a stage assembly configured to move the flow cell interface relative to the infrared sensor; and
a controller to command the temperature control device to cause the flow cell support to achieve a temperature value, cause the infrared sensor to measure an actual temperature value of the flow cell support, and calibrate the temperature control device based on a difference between the commanded temperature value and the actual temperature value.

2. The apparatus of claim 1, wherein the temperature control device comprises a thermoelectric cooler.

3. The apparatus of claim 2, wherein the temperature control device further comprises a resistance temperature detector.

4. The apparatus of claim 3, wherein the controller is to calibrate the temperature control device by calibrating the resistance temperature detector.

5. The apparatus of claim 1, further comprising an imaging system, the infrared sensor coupled to the imaging system.

6. The apparatus of claim 1, wherein the controller is further to calibrate the infrared sensor.

7. The apparatus of claim 1, further comprising a temperature sensor; wherein the infrared sensor is to measure a first temperature value adjacent to the temperature sensor; the temperature sensor is to measure a second temperature value; and the controller is to calibrate the infrared sensor based on a difference between the first temperature value and the second temperature value.

8. The apparatus of claim 7, wherein the flow cell interface further comprises a flow cell deck carrying the flow cell support, the temperature sensor coupled to the flow cell deck.

9. The apparatus of claim 8, further comprising a printed circuit board coupled to the temperature sensor, the printed circuit board positioned between the temperature sensor and the flow cell deck.

10. The apparatus of claim 7, further comprising a metallic layer covering a surface of the temperature sensor.

11. The apparatus of claim 1, further comprising a temperature sensor; wherein the infrared sensor is to measure a first temperature value of the flow cell support; the temperature sensor is to measure a second temperature value at the flow cell support; and the controller is to calibrate the infrared sensor based on a difference between the first temperature value and the second temperature value.

12. The apparatus of claim 11, further comprising a printed circuit board coupled to the temperature sensor, the temperature sensor positioned between the flow cell interface and the printed circuit board.

13. The apparatus of claim 1, wherein a surface of the flow cell support comprises a metallic layer.

14. An apparatus, comprising:
a flow cell interface including a flow cell support adapted to have a flow cell positioned thereon;
a temperature control device for the flow cell support;
an infrared sensor;
a stage assembly configured to move the flow cell interface relative to the infrared sensor; and
a controller to command the temperature control device to cause the flow cell support to achieve a temperature value, and cause the infrared sensor to measure a plurality of actual temperature values of the flow cell support.

15. The apparatus of claim 14, wherein the controller is to generate a heat map based on the plurality of actual temperature values measured.

16. The apparatus of claim 15, wherein the controller is to diagnosis an error based on the heat map.

17. The apparatus of claim 15, wherein the controller is to calibrate the temperature control device based on the heat map.

18. The apparatus of claim 15, wherein the heat map comprises a 2-D heat map.

19. An apparatus, comprising:
a flow cell interface including a flow cell support adapted to support a flow cell;
a temperature control device for the flow cell support;
an infrared sensor;
a temperature sensor;
a stage assembly configured to move the flow cell interface relative to the infrared sensor; and
a controller,
wherein the infrared sensor is to measure a first temperature value adjacent to the temperature sensor; the temperature sensor is to measure a second temperature value; and the controller is to calibrate the infrared sensor based on a difference between the first temperature value and the second temperature value.

20. The apparatus of claim 19, further comprising a flow cell carrying the temperature sensor.

21. The apparatus of claim 20, wherein the flow cell comprises a mock flow cell.

22. An apparatus, comprising:
a flow cell interface including a flow cell support adapted to have a flow cell positioned thereon;
a temperature control device for the flow cell support;
an infrared sensor; and
a controller to command the temperature control device to cause the flow cell support to achieve a temperature value, cause the infrared sensor to measure an actual temperature value of the flow cell support, and calibrate the temperature control device based on a difference between the commanded temperature value and the actual temperature value,
wherein the flow cell interface or the infrared sensor are configured to move relative to the other of the flow cell interface or the infrared sensor.

23. The apparatus of claim 22, further comprising a stage assembly configured to move the flow cell interface relative to the infrared sensor.

\* \* \* \* \*